United States Patent
Lee et al.

(10) Patent No.: US 11,940,184 B2
(45) Date of Patent: Mar. 26, 2024

(54) COOLING MACHINE

(71) Applicant: LG ELECTRONICS INC., Seoul (KR)

(72) Inventors: Heungju Lee, Seoul (KR); Yongsun Cho, Seoul (KR); Jaeseo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 429 days.

(21) Appl. No.: 17/148,977

(22) Filed: Jan. 14, 2021

(65) Prior Publication Data
US 2021/0215405 A1 Jul. 15, 2021

(30) Foreign Application Priority Data

Jan. 15, 2020 (KR) .................. 10-2020-0005507

(51) Int. Cl.
*F25B 15/02* (2006.01)

(52) U.S. Cl.
CPC .................. *F25B 15/02* (2013.01)

(58) Field of Classification Search
CPC ...... F25B 15/02; F25B 15/008; F25B 15/006; F25B 15/04; F25B 15/06; F25B 49/043; F25B 41/20; F25B 43/00; F25B 49/04; F25B 41/40; F25B 2315/005; F25B 2600/05; F25B 2600/2501; F25B 41/42; F25B 2400/23; Y02A 30/27; Y02B 30/62
See application file for complete search history.

(56) References Cited

U.S. PATENT DOCUMENTS 5,931,007 A * 8/1999 Sgamboti .............. F25B 15/008
62/476
6,230,517 B1 * 5/2001 Ishiguro .................. F25B 41/28
62/484
(Continued)

FOREIGN PATENT DOCUMENTS

CN 1184922 A 6/1998
CN 1788184 A 6/2006
(Continued)

OTHER PUBLICATIONS

Notice of Allowance, dated Jun. 22, 2021, issued in Korean Patent Application No. 10-2020-0005507 (3 pages).

*Primary Examiner* — Miguel A Diaz
*Assistant Examiner* — Ibrahim A. Michael Adeniji
(74) *Attorney, Agent, or Firm* — Birch, Stewart, Kolasch & Birch, LLP

(57) ABSTRACT

The present disclosure relates to an absorption cooling machine including an absorber, a first regenerator, a second regenerator, a condenser, an expansion device, and an evaporator, and relates to a cooling machine that prevents the refrigerant from flowing backward to the first regenerator under a low pressure condition by installing a gas-liquid separator that separates the refrigerant discharged from the first and second regenerators and flows into the condenser into a gas state and a liquid state, in order to heat the absorption solution supplied from the absorber to separate into a refrigerant and an absorbent, and to smoothly discharge the refrigerant from the first regenerator and the second regenerator for discharging the separated refrigerant to the condenser.

18 Claims, 6 Drawing Sheets

(56) References Cited

U.S. PATENT DOCUMENTS

| | | | | |
|---|---|---|---|---|
| 9,994,751 B2* | 6/2018 | Hulse | ................... | F25B 15/02 |
| 2002/0069665 A1* | 6/2002 | Erickson | ................... | F02C 6/18 |
| | | | | 62/331 |
| 2005/0193758 A1* | 9/2005 | Wells | ................... | F25B 25/02 |
| | | | | 62/476 |
| 2006/0230776 A1* | 10/2006 | Inoue | ................... | F25B 15/02 |
| | | | | 62/476 |
| 2013/0319027 A1* | 12/2013 | Tsubouchi | ............. | F25B 27/02 |
| | | | | 62/238.7 |

FOREIGN PATENT DOCUMENTS

| | | |
|---|---|---|
| CN | 101813397 A | 8/2010 |
| CN | 102032708 A | 4/2011 |
| CN | 108091474 A | 11/2016 |
| CN | 108375238 A | 8/2018 |
| CN | 110259533 A | 9/2019 |
| JP | H08-159594 A | 6/1996 |
| KR | 10-1071409 | 10/2011 |
| KR | 10-2013-0137786 | 12/2013 |
| KR | 10-2015-0007131 | 1/2015 |

* cited by examiner

COOLING MACHINE

BACKGROUND

1. Technical Field

The present disclosure relates to a cooling machine, and more particularly, to a gas-liquid separation apparatus for smoothly discharging refrigerant from a regenerator of an absorption cooling machine to a condenser.

2. Description of the Related Art

A cooling machine, which is a facility for lowering the temperature of cold water, reduces the temperature of a cold water through a series of cycles in which a high-temperature and high-pressure refrigerant is condensed by heat exchange with the cooling water, and then goes through an expansion process to reduced to a low temperature and low pressure state, and the low temperature and low pressure refrigerant absorbs heat from cold water and evaporates to cool cold water.

At this time, according to the method of making the refrigerant into a high temperature and high pressure state, a cooling machine can be classified as a compression cooling machine that compresses refrigerant into high temperature and high pressure state by a compressor, and an absorption cooling machine that extracts high-temperature and high-pressure refrigerant by heating it in a regenerator in the state of an absorption solution mixed with an absorbent.

Among these, in the case of a large building that requires cooling of large-capacity cold water, it is common to use an absorption cooling machine.

The absorption cooling machine includes an absorber that dissolves the refrigerant into the absorbent to make an absorption solution and then supplies it to the regenerator, a regenerator that heats the absorption solution supplied from the absorber to separate into a liquid absorbent and a gas state refrigerant, a condenser that heat exchanges the gas state refrigerant introduced from the regenerator into a liquid state, an expansion device that expands and depressurizes the liquid refrigerant introduced from the condenser, and an evaporator that evaporates the liquid refrigerant introduced from the expansion device by heat exchange with cold water, and then introduces again into the absorber.

The absorption cooling machine may be classified into a single-utility absorption cooling machine using a single regenerator, a double-utility absorption cooling machine using two regenerators, and a triple-utility absorption cooling machine using three regenerators.

Among the three types of absorption cooling machine, a double-utility or triple-utility absorption cooling machine that can obtain high efficiency is generally used in a large building.

The regenerator of the double-utility or triple-utility absorption cooling machine is configured to have a dualized refrigerant loop so that the refrigerant is separated into a liquid state or a gas state by heating the absorption solution, the gas state refrigerant separated from the regenerator is changed into a liquid state through a condenser and flows into an expansion device, and the liquid refrigerant flows directly into the expansion device without a state change.

However, the liquid refrigerant discharged respectively from the regenerator under the high pressure condition and the regenerator under the low pressure condition undergoes a flashing phenomenon in which high-pressure liquid refrigerant evaporates due to the differential pressure between refrigerants in the process of joining before flowing into the condenser, and there occurs a phenomenon in which the liquid refrigerant cannot flow into the condenser due to the flashing phenomenon, and flows backward into the regenerator of a low pressure condition.

Due to this, a section where the refrigerant is stagnated is formed, and the refrigerant circulation rate decreases, and as the water level of the regenerator having a low pressure condition increases, the absorbent is not recovered into the absorber but flows into the condenser along a refrigerant flow pipe to contaminate the refrigerant flow pipe, thereby degrading the performance of the cooling machine.

In Korean Patent Registration No. 10-1702952, the overall efficiency of the cooling machine is increased by changing the arrangement structure of the regenerator, but a method for solving the above problems caused by the differential pressure between refrigerants discharged from the regenerators under different pressure conditions is not proposed.

Korean Patent Registration No. 10-2038436 discloses a gas-liquid separator installed in a regenerator operating under high temperature and high pressure condition, but suggests only a method for separating a liquid absorbent and a gas state refrigerant that have the same pressure. Accordingly, it was difficult to apply it as a solution to solve the above problems.

SUMMARY

The present disclosure has been made in view of the above problems, and provides a gas-liquid separator that is installed a gas-liquid separator in a pipeline through which a liquid refrigerant discharged from a regenerator flows into a condenser, and separates refrigerant vaporized by a flashing phenomenon, thereby preventing the flow-back of the refrigerant into the regenerator of a low pressure condition due to the increase in the specific volume of the refrigerant and smoothly discharging the refrigerant.

The present disclosure further provides a dualized refrigerant loop so that the gas state refrigerant and the liquid refrigerant are separated and the gas state refrigerant is condensed through the condenser, and the liquid refrigerant can be introduced into the expansion device without a condensation process, thereby increasing the efficiency in the condenser.

The present disclosure further provides a reverse flow prevention system to block the flow-back of the refrigerant by detecting a refrigerant flowing backward to the regenerator, thereby quickly responding to defective operation and preventing the failure or lifetime shortening of the cooling machine due to defective operation.

The problems of the present disclosure are not limited to the problems mentioned above, and other problems not mentioned will be clearly understood by those skilled in the art from the following description.

In accordance with an aspect of the present disclosure, a cooling machine includes: an absorber in which an absorption solution is generated by mixing a refrigerant and an absorbent, a first regenerator and a second regenerator in which the absorption solution discharged from the absorber is heated to be separated into the refrigerant and the absorbent, a condenser in which the refrigerants separated from the first regenerator and the second regenerator flow in and exchange heat, an expansion device for depressurizing the refrigerant introduced from the condenser, an evaporator for heat-exchanging the refrigerant introduced from the expansion device with a cold water and re-introducing the refrigerant to the absorber, a first drain pipe through which the refrigerant discharged from the first regenerator and flows into the condenser flows, a second drain pipe through which the refrigerant discharged from the second regenerator and flows into the condenser flows, and a gas-liquid separator for separating the refrigerant flowing the first drain pipe and the second drain pipe into a gas state and a liquid state.

A confluence point where the refrigerant flowing in the first drain pipe and the second drain pipe are converged may be formed, and the refrigerants may be converged at the confluence point and then introduced into the gas-liquid separator.

The refrigerant flowing through the second drain pipe may flow to the confluence point in a state in which the pressure is lowered by the decompression device, and a pressure difference may exist between the refrigerants converging at the confluence point.

The gaseous refrigerant separated from the gas-liquid separator may flow into the upper portion of the condenser and undergo a heat exchange process, and the liquid refrigerant separated from the gas-liquid separator may flow into the lower portion of the condenser and immediately flow into the expansion device.

The gas-liquid separator may be disposed at a lower position than the regenerator to receive the refrigerant, the gaseous refrigerant discharged from the regenerator may be discharged to a higher position than the regenerator, the gaseous refrigerant separated by the gas-liquid separator may be discharged to the upper portion of the gas-liquid separator, and the liquid refrigerant separated by the gas-liquid separator may be discharged to the lower portion of the gas-liquid separator.

The regenerator may be connected to a water level sensor measuring the water level of the regenerator, and a backflow prevention device for adjusting the opening degree according to the measured value of the water level sensor may be connected to the first drain pipe.

The refrigerator may further include a dryness meter for measuring the dryness of the refrigerant passing through the confluence point, and the backflow prevention device which adjusts the opening degree according to the measured value of the dryness meter may be connected to the first drain pipe.

Specific details of other embodiments are included in the detailed description and drawings.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
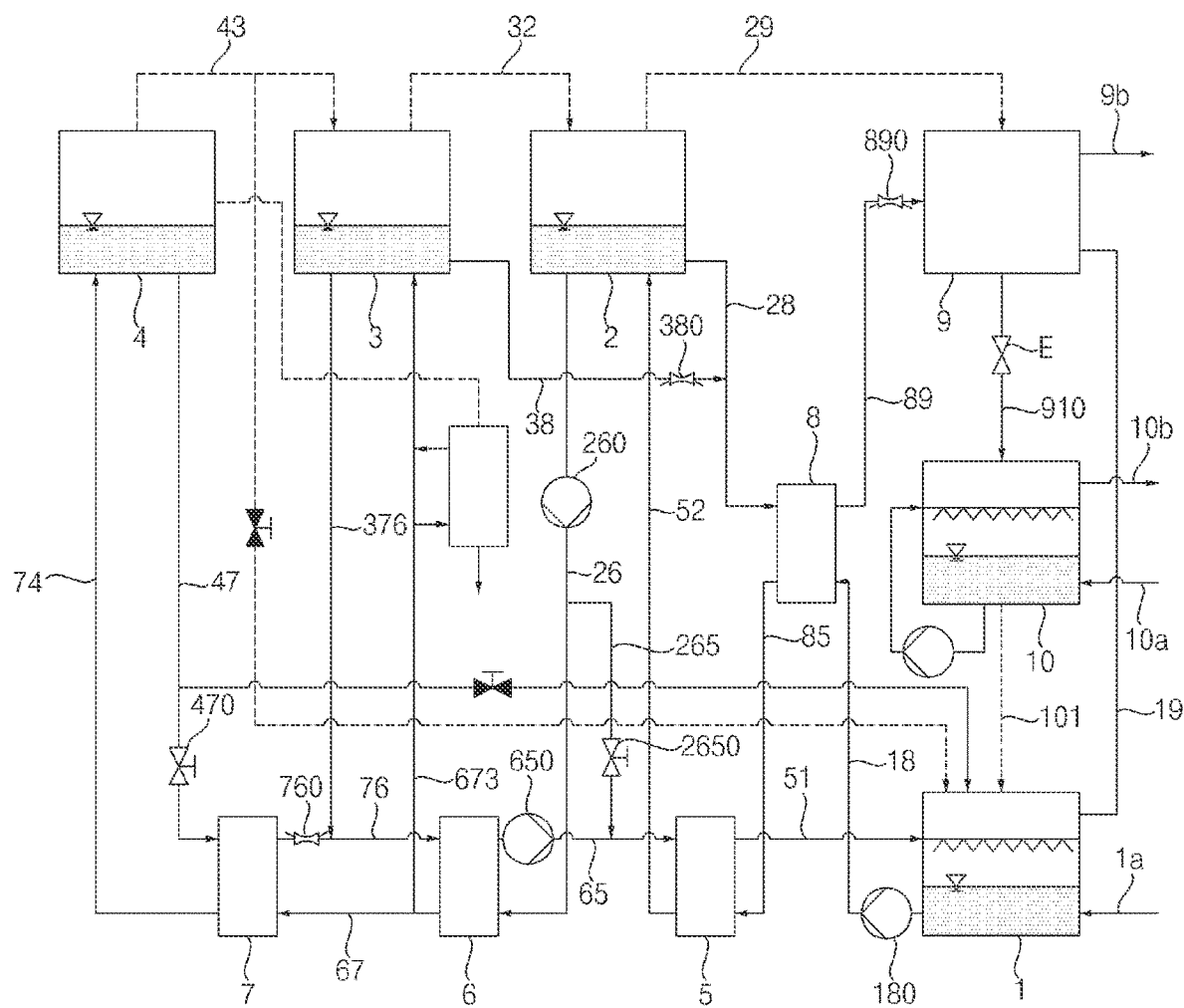
FIG. 1 is a schematic configuration diagram of a triple-utility absorption cooling machine.

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Like reference numerals refer to like elements throughout the specification.

Hereinafter, the present disclosure will be described with reference to drawings for explaining a cooling machine according to embodiments of the present disclosure.

The cooling machine, which is facilities for lowering the temperature of cold water, can be classified into a compression cooling machine and an absorption cooling machine according to a method of making the refrigerant into a high temperature and high pressure state.

Among them, unlike a compression cooling machine that uses a compressor to making the refrigerant into a high temperature and high pressure state, the absorption cooling machine uses a method of separating the refrigerant in the high temperature and high pressure state by heating the absorption solution that is a mixture of the absorbent and the refrigerant in a regenerator.

The absorption cooling machine may be classified into a single-utility, a double-utility, and a triple-utility according to the regenerator used, the double-utility absorption cooling machine is a cooling machine that separates the absorption solution by using two types of regenerators, and the triple-utility absorption cooling machine is a cooling machine that separates the absorption solution by using three types of regenerators.

The double-utility or triple-utility absorption cooling machine having high-efficiency is generally used as the absorption cooling machine that is used in a large building in order to cool large-capacity cold water.

Water H2O or ammonia NH3 is generally used as the refrigerant used in the absorption cooling machine.

Hereinafter, with reference to FIG. 1, the configuration and operation principle of the triple-utility absorption cooling machine will be described.

The expressions of high temperature, medium temperature, low temperature with respect to temperature and high pressure, medium pressure, and low pressure with respect to pressure are a comparative concept for describing a relative temperature between respective regenerator 2, 3, 4 or respective heat exchange units 5, 6, 7, or a directional concept for indicating the heat entry and exit path related to heat emission and absorption occurring in each heat exchange unit 5, 6, 7. Further, they are only for convenience of description, and not limited to any specific temperature range.

The triple-utility absorption cooling machine may be configured of a cycle including an absorber 1 that dissolves the refrigerant of a gas state into a liquid absorbent to make an absorption solution and supplies the absorption solution to a regenerators 2, 3, 4, a regenerator 2, 3, 4 that heats the absorption solution supplied from the absorber 1 to separate into a refrigerant and an absorbent, a heat exchange unit 5, 6, 7 that exchanges the heat of the absorbent separated from the regenerators 2, 3, 4 and recovered by the absorber 1 with the absorption solution supplied from the absorber 1 to the regenerators 2, 3, 4, a refrigerant condensation heat exchange unit 8 for heat-exchanging the liquid refrigerant discharged from the regenerators 2, 3 with the absorption solution discharged from the absorber 1, a condenser 9 for condensing the refrigerant separated from the regenerator 2, 3, 4 by heat exchange with the cooling water, an expansion device E for expanding and decompressing the liquid refrigerant discharged from the condenser 9, and an evaporator 10 that evaporates the decompressed refrigerant by heat-exchanging with cold water and then re-flows it into the absorber 1.

The supply of the absorption solution from the absorber 1 is not limited to the operation of being directly connected to the absorber 1 and supplied with the absorption solution, but also includes the operation of being connected indirectly through other components to receive the absorption solution.

The regenerator 2, 3, 4 includes a third regenerator 4 for heating the absorption solution supplied from the absorber 1 through an external heat source to separate into the high-temperature refrigerant and an absorbent, a second regenerator 3 for separating the absorption solution supplied from the absorber 1 into a medium temperature refrigerant and an absorbent by using the high-temperature refrigerant supplied from the third regenerator 4 as a heat source, and a first regenerator 2 for separating the absorption solution supplied from the absorber 1 into a low-temperature refrigerant and an absorbent by using medium-temperature refrigerant supplied from the second regenerator 3 as a heat source.

In the regenerator 2, 3, 4, the temperature and pressure are increased in the order of the first regenerator 2, the second regenerator 3, and the third regenerator 4. Therefore, hereinafter, the first regenerator 2 is referred to as a low temperature regenerator 2, the second regenerator 3 as a medium temperature regenerator 3, and the third regenerator 4 as a high temperature regenerator 4.

The absorbent separated from the regenerator 2, 3, 4 may undergo a heat exchange process in the heat exchange unit 5, 6, 7 in the process of being recovered to the absorber 1.

Hereinafter, it will be referred to as a low temperature heat exchange unit 5, a medium temperature heat exchange unit 6, and a high temperature heat exchange unit 7 in the order in which the temperature condition of heat exchange is low.

The high temperature heat exchange unit 7 heat-exchanges the high-temperature absorbent separated from the high temperature regenerator 4 and introduced through a high-temperature discharge pipe 47 with the absorption solution of the medium temperature discharged from the medium-temperature heat exchange unit 6 and introduced through a second supply pipe 67, and then, the heat-exchanged absorption solution of the medium temperature is discharged to a first connection pipe 76, and the heat-exchanged high-temperature absorption solution is discharged to a high-temperature inflow pipe 74.

The medium temperature absorbent discharged from the high temperature heat exchange unit 7 is introduced into the medium-temperature heat exchange unit 6 together with the medium temperature absorbent that is separated from the medium temperature regenerator 3 and joined to the first connection pipe 76 through the medium temperature discharge pipe 376, and heat-exchanges with the low-temperature absorption solution that is separated from the low-temperature regenerator 2 and introduced into the medium temperature heat exchange unit 6 through the low-temperature discharge pipe 26. The low-temperature absorbent heat-exchanged in the medium temperature heat exchange unit 6 is discharged to the second connection pipe 65, and the heat-exchanged medium temperature absorption solution is discharged to the second supply pipe 67.

The low-temperature absorbent discharged from the medium temperature heat exchange unit 6 is introduced into the low temperature heat exchange unit 5 along with the low-temperature absorption solution that is separated from the low-temperature regenerator 2 and joined to the second connection pipe 65 through a low-temperature branch pipe 265, and heat-exchanges with the medium-temperature absorption solution discharged from the refrigerant condensation heat exchange unit 8. After the heat exchange, the absorption solution that is introduced into the low temperature heat exchange unit 5 in the state of a low temperature absorption solution is recovered to the absorber 1 through the third connection pipe 51, and the absorption solution introduced into the low temperature heat exchange unit 5 in the state of the absorption solution of the middle temperature is heat-exchanged and then flows into the low temperature regenerator 2 through the low temperature inflow pipe 52.

The refrigerant condensation heat exchange unit 8 can heat-exchange the refrigerant in the liquid state introduced from the medium temperature regenerator 3 and the low temperature regenerator 2 with the absorption solution introduced through an absorber discharge pipe 18 from the absorber 1, and may discharge the heat-exchanged absorption solution to the condenser 9 and discharge the heat-exchanged absorption solution to the first supply pipe 85.

A first control valve 470 for controlling the flow rate of the high temperature and high pressure absorbent is connected to a high temperature discharge pipe 47 to control the flow rate of the absorbent flowing into the high temperature heat exchange unit 7.

An absorbent pressure reducing valve 760 for preventing a differential pressure generated between the absorbent joining through the medium temperature discharge pipe 376 and the absorbent discharged from the high temperature heat exchange unit 7 is connected to the first connection pipe 76 to prevent the absorbent from flowing back to the medium temperature regenerator 3 through the medium temperature discharge pipe 376.

The second control valve 2650 for controlling the flow rate of the low temperature and low pressure absorption solution is connected to the low temperature branch pipe 265 to control the flow rate of the absorbing liquid flowing into the low temperature heat exchange unit 5.

The absorber or absorption solution flowing through the absorber discharge pipe 18, the low temperature discharge pipe 26, and the second connection pipe 65 can be extruded by a first pump 180, a second pump 260, and a third pump 650.

The absorber 1 of the cooling machine is set as a starting point, and the cycle is as follows. The refrigerant is dissolved in the absorbent in the absorber 1 and is supplied as an absorption solution of liquid state to the high temperature regenerator 4, the medium temperature regenerator 3, and the low temperature regenerator 2. The absorption solution supplied to each of the regenerators 2, 3 and 4 is heated by a heat source to be separated into a refrigerant and an absorbent, the refrigerant is supplied to the condenser 9, and the absorbent is recovered to the absorber 1.

The refrigerant supplied to the condenser 9 is condensed by exchanging heat with the cooling water, depressurized through the expansion device E, and then supplied to the evaporator 10. The refrigerant supplied to the evaporator 10 is evaporated by exchanging heat with cold water, and in this process, the temperature of the cold water is lowered while discharging heat to the refrigerant. The refrigerant discharged from the evaporator 10 flows into the absorber 1 and lowers the temperature of the cold water while repeatedly rotating the series of cycles as described above.

The cycle focusing on the flow of the absorbent is as follows. The absorbent that flows into the refrigerant condensation heat exchange unit 8 through the absorber discharge pipe 18 in the state of absorption solution as the refrigerant is dissolved in the absorber 1 heat-exchanges with the refrigerant in the refrigerant condensation heat exchange unit 8 to receive heat, and then flows into the low temperature heat exchange unit 5 through the first supply pipe 85.

The absorption solution introduced into the low-temperature heat exchange unit 5 is supplied with heat, and then discharged to the low-temperature inflow pipe 52 to flow into the low-temperature regenerator 2, and a part of the absorption solution introduced into the low-temperature regenerator 2 is separated into a refrigerant and an absorbent. The separated absorbent and the non-separated absorption solution may be discharged to the low-temperature discharge pipe 26 and introduced into the medium temperature heat exchange unit 2, or may join the second connection pipe 65 through the low temperature branch pipe 265 branched from the low temperature discharge pipe 26.

The absorption solution introduced into the medium temperature heat exchange unit 6 is discharged to the second supply pipe 67 after being supplied with heat, and introduced into the high temperature heat exchange unit 7, or introduced into the medium temperature regenerator 3 through the medium temperature inflow pipe 673 branched from the second supply pipe 67.

Part of the absorption solution introduced into the medium temperature regenerator 3 is separated into a refrigerant and an absorbent, and the separated absorbent and non-separated absorption solution are discharged to the medium temperature discharge pipe 376 to join the first connection pipe 76 to flow into the medium temperature heat exchange unit. 6.

The absorption solution introduced into the high-temperature heat exchange unit 7 flows into the high-temperature regenerator 4 after being supplied with heat, and is separated into the refrigerant and the absorbent and the separated absorbent flows into the high-temperature heat exchange unit 7 through the high-temperature discharge pipe 47.

The absorbent introduced into the high temperature heat exchange unit 7 dissipates heat and is discharged to the first connection pipe 76 and flows into the medium temperature heat exchange unit 6, and dissipates heat again, and then is discharged to the second connection pipe 65 and flows into the low temperature heat exchange unit 5, and dissipates heat again, and then is recovered by the absorber 1.

The cycle focusing on the flow of cooling water is as follows. The cooling water flowing into the absorber 1 through a cooling water supply pipe 1a undergoes a heat exchange process, and then flows into the condenser 9 through a cooling water flow pipe 19 and absorbs heat from the refrigerant to condense the refrigerant, and then is discharged through a cooling water discharge pipe 9b.

The cycle focusing on the flow of the cold water is as follows. The cold water flows into the evaporator 10 through a cold water inflow pipe 10a, dissipates heat to the refrigerant to evaporate the refrigerant, and then is discharged through a cold water discharge pipe 10b while the temperature is lowered.

Figure 2:
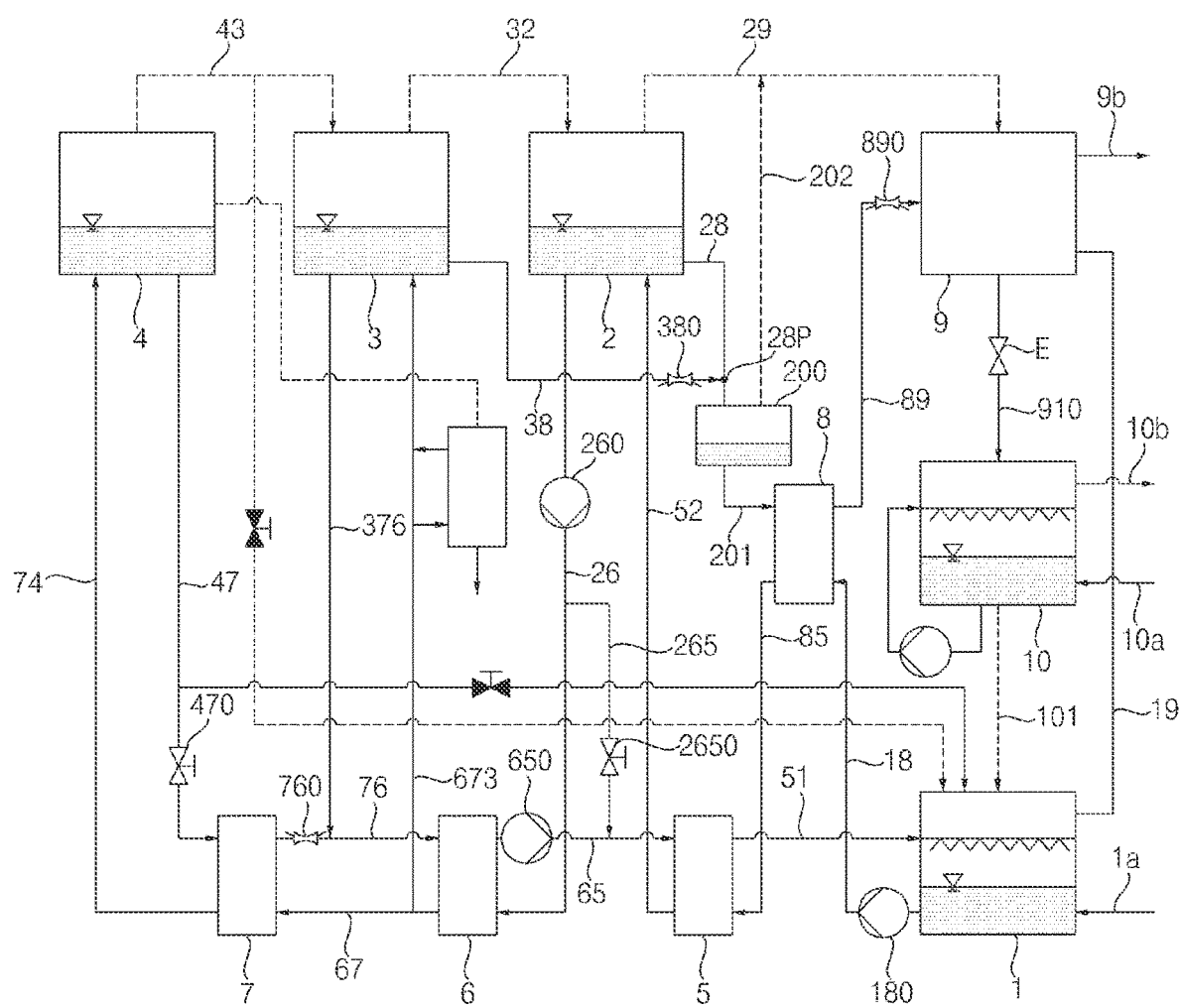
FIG. 2 is a schematic configuration diagram of a cooling machine according to an embodiment of the present disclosure.
Figure 4:
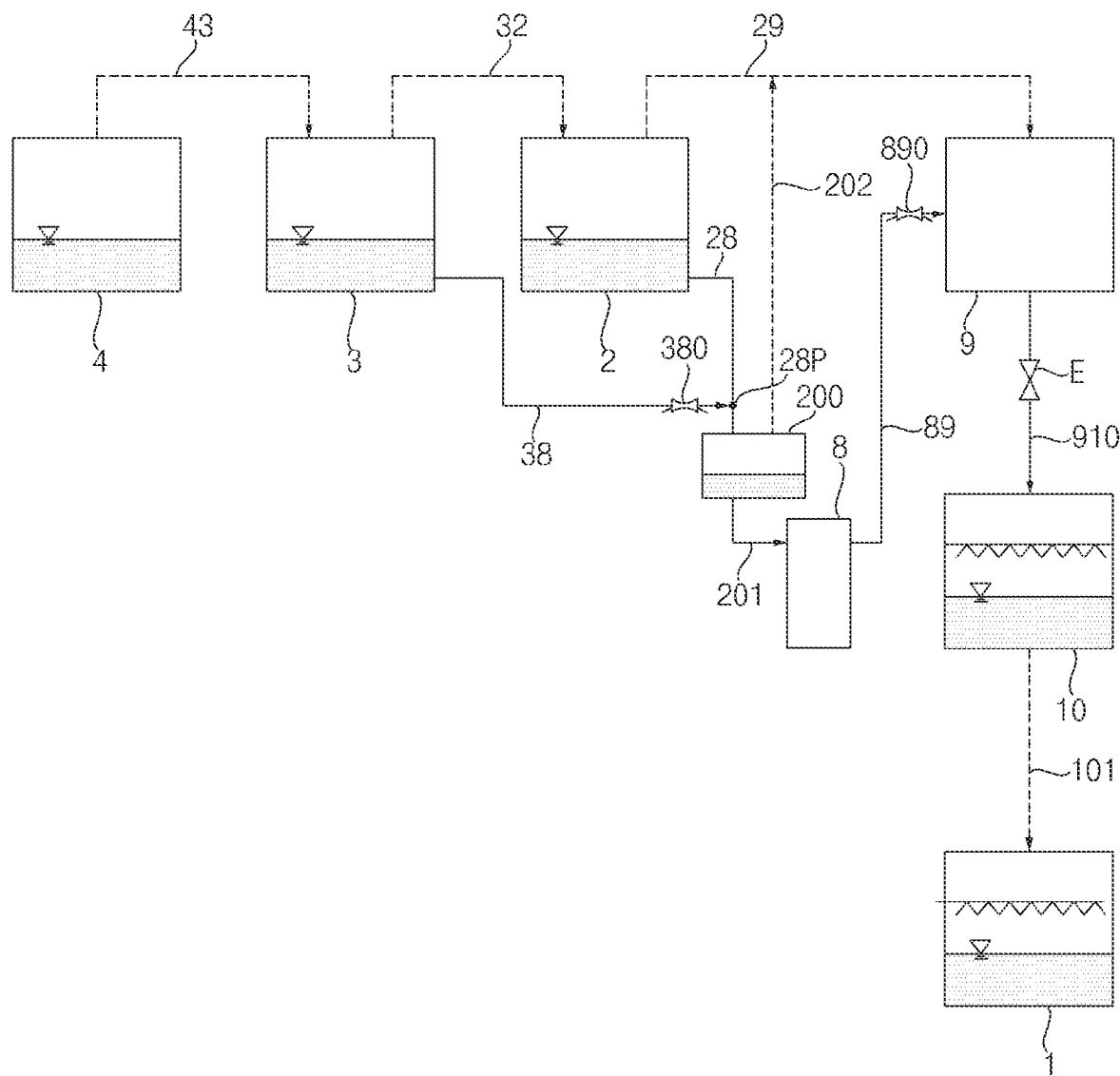
FIG. 4 is a diagram showing the flow of a refrigerant according to an embodiment of the present disclosure.

Hereinafter, a cooling machine according to an embodiment of the present disclosure will be described with reference to FIGS. 2 and 4.

The cycle focusing on the flow of the refrigerant is described with reference to FIG. 4. The refrigerant flowing into the high temperature regenerator 4 in the absorption solution state is heated by an external heat source not shown and separated into a gas state, and flows into the medium temperature regenerator 3 through a third gas pipe 43.

The absorption solution introduced into the medium temperature regenerator 3 through a medium temperature inflow pipe 673 is heated by using a high temperature and high pressure refrigerant introduced into the medium temperature regenerator 3 through the third gas pipe 43 as a heat source, and is separated into a refrigerant and an absorbent.

The medium temperature and medium pressure gas refrigerant separated from the medium temperature regenerator 3 is discharged through a second gas pipe 32 and flows into the low temperature regenerator 2, and is used as a heat source for heating the absorption solution introduced into the low temperature regenerator 2 through a low temperature inflow pipe 52, and separates the absorption solution into a refrigerant and an absorbent, and the separated refrigerant flows into the condenser 9 through a first gas pipe 29.

Meanwhile, the refrigerant separated from the medium temperature regenerator 3 and the low temperature regenerator 2 may be a gas state or a liquid state, and as described above, the refrigerant in the gas state flows into the condenser 9 through the second gas pipe 32 and the first gas pipe 29, and the liquid refrigerant may be discharged through a first drain pipe 28 and a second drain pipe 38 to join at a confluence point 28P.

A decompression device 380 for removing the differential pressure generated between the refrigerants discharged from the medium temperature regenerator 3 and the low temperature regenerator 2 at the confluence point 28P may be connected to a second drain pipe 38.

However, if the decompression device 380 does not function properly, the refrigerant flowing through the second drain pipe 38 may have a higher pressure than the refrigerant that flows through the first drain pipe 28 even if the pressure is lowered by the decompression device 380.

In this case, due to the pressure difference between the refrigerants near the confluence point 28P, a flashing phenomenon in which some liquid refrigerant in a saturated state vaporize may occur, and the specific volume of the refrigerant increases rapidly, so that the refrigerant cannot be discharged smoothly to the condenser 9 and may flow back to the low temperature regenerator 2.

The refrigerant flowing back into the low-temperature regenerator 2 raises the water level of the low-temperature regenerator 2, thereby causing a problem that the absorbent is introduced through the second gas pipe 32 and the first gas pipe 29. In addition, the refrigerant circulation rate decreases as the amount of refrigerant stagnating in the low temperature regenerator 2 due to backflow increases, thereby decreasing the efficiency of the cooling machine.

Therefore, the cooling machine according to an embodiment of the present disclosure can solve the above problem by removing the vaporized refrigerant generated by the flashing phenomenon through a gas-liquid separator to prevent a sudden increase in specific volume.

The refrigerant joined at the confluence point 28P may be introduced into the gas-liquid separator 200. The refrigerant introduced into the gas-liquid separator 200 may be in a state in which a gas state and a liquid state are mixed by the above-described flashing phenomenon.

The gas-liquid separator 200 may be a centrifugal gas-liquid separator using a centrifugal force according to a known technology, and the driving principle or structure of the gas-liquid separator is a well-known technology, and thus a description thereof will be omitted.

Since the refrigerant introduced into the gas-liquid separator 200 is water H2O or ammonia NH3 having a lower density than air, the gas state refrigerant separated by the gas-liquid separator 200 flows to the upper portion of the gas-liquid separator 200 and may be discharged through a gas state discharge pipe 202.

The gas state refrigerant separated by the gas-liquid separator 200 may flow into the upper portion of the condenser 9 by joining the first gas pipe 29 through the gas state discharge pipe 202, and the liquid refrigerant separated by the gas-liquid separator 200 flows into the refrigerant condensation heat exchange unit 8 through a liquid state discharge pipe 201 and dissipates heat, and then may be introduced to the lower portion of the condenser 9 through a condenser inflow pipe 89.

At this time, the gas state refrigerant flowing into the upper portion of the condenser 9 may be condensed through a heat exchange process with the cooling water flowing through a cooling water pipe not shown inside the condenser 9 and flow to the lower portion of the condenser 9, and may join the refrigerant introduced into the lower portion of the condenser 9 through the condenser inflow pipe 89, and be discharged to a condensation refrigerant pipe 910 to be introduced into the expansion device E.

The refrigerant flowing into the expansion device E expands and flows into the evaporator 10 under reduced pressure, absorbs heat from the cold water in the evaporator 10 to lower the temperature of the cold water, and then can be introduced into the absorber 1 through a refrigerant recovery pipe 101 and dissolved again in the absorbent.

Therefore, when the gas-liquid separator 200 is not operated, the gas state refrigerant flowing into the lower portion of the condenser 9 through the condenser inflow pipe 89 is not condensed, but may be immediately discharged to the condensation refrigerant pipe 910 and introduced into the evaporator 10, and accordingly, the flow rate of the refrigerant heat-exchanged with the cold water in the evaporator 10 is reduced, so that the cold water may not be cooled to an appropriate temperature.

In addition, a refrigerant loop is configured to be dualized such that the liquid refrigerant flows into the lower portion of the condenser 9 through the condenser inflow pipe 89, and the gas state refrigerant flows into the upper portion of the condenser 9 through the first gas pipe 29, thereby efficiently managing the condensation process in the condenser 9.

The decompression device 380 and the gas-liquid separator 200 may be connected to at least one of a first drain pipe 28, a second drain pipe 38, a liquid state discharge pipe 201, and a condenser inflow pipe 89. In view of the purpose of removing the differential pressure and smoothly discharging the refrigerant, preferably, the decompression device 380 may be connected to the second drain pipe 28, and the gas-liquid separator may be connected to the first drain pipe 28 and the liquid state discharge pipe 201.

The first drain pipe 28 and the second drain pipe 38 may extend in the direction of gravity to join at the confluence point 28P, and the first drain pipe 28 extends in the direction of gravity from the confluence point 28P and can be connected to the upper portion of the gas-liquid separator 200. Accordingly, the liquid state refrigerant may be introduced into the gas-liquid separator 200 without inputting additional energy due to gravity.

The gas state discharge pipe 202 may be connected to the upper portion of the gas-liquid separator 200, and the liquid state discharge pipe 201 may be connected to the lower portion of the gas-liquid separator 200. Accordingly, the liquid refrigerant may be sunk by gravity without any additional energy input and be discharged to the liquid state discharge pipe 201, and the low-density gas state refrigerant (water H2O or ammonia NH3) can be joined to the first gas pipe 29 through the upper gas state discharge pipe 202 and introduced into the condenser 9.

The first gas pipe 29 into which the gas state refrigerant is introduced may be connected to the upper portion of the condenser 9, and the condenser inflow pipe 89 into which the liquid state refrigerant is introduced may be connected to the lower portion of the condenser 9. Accordingly, the gas state refrigerant which requires a condensation process is condensed by heat-exchanging with the cooling water, and then may fall to the lower portion of the condenser 9 by gravity and be discharged through the condensation refrigerant pipe 910. The liquid state refrigerant which does not require a condensation process may be discharged through the condensation refrigerant pipe 910, immediately after flowing into the lower portion of the condenser 9.

The refrigerant discharged through the liquid state discharge pipe 201 from the gas-liquid separator 200 may be introduced into the refrigerant condensation heat exchange unit 8, and may be condensed by heat-exchanging with the absorption solution introduced into the refrigerant condensation heat exchange unit 8 through the absorber discharge pipe 18, and then may be introduced into the condenser 9 through the condenser inflow pipe 89. Accordingly, the gas state refrigerant, which is not completely separated by the gas-liquid separator 200, is condensed while passing through the refrigerant condensation heat exchange unit 8, thereby preventing the occurrence of above-described problem due to the remaining gas state refrigerant.

The refrigerant discharged from the refrigerant condensation heat exchange unit 8 and introduced into the condenser 9 may be depressurized by a liquid state decompression device 890 connected to the condenser inflow pipe 89 and introduced into the condenser 9. Accordingly, it is possible to prevent the refrigerant from flowing backward to the low temperature regenerator 2 through the first gas pipe 29 due to the differential pressure between the refrigerants flowing the condenser inflow pipe 89 and the first gas pipe 29.

Figure 3:
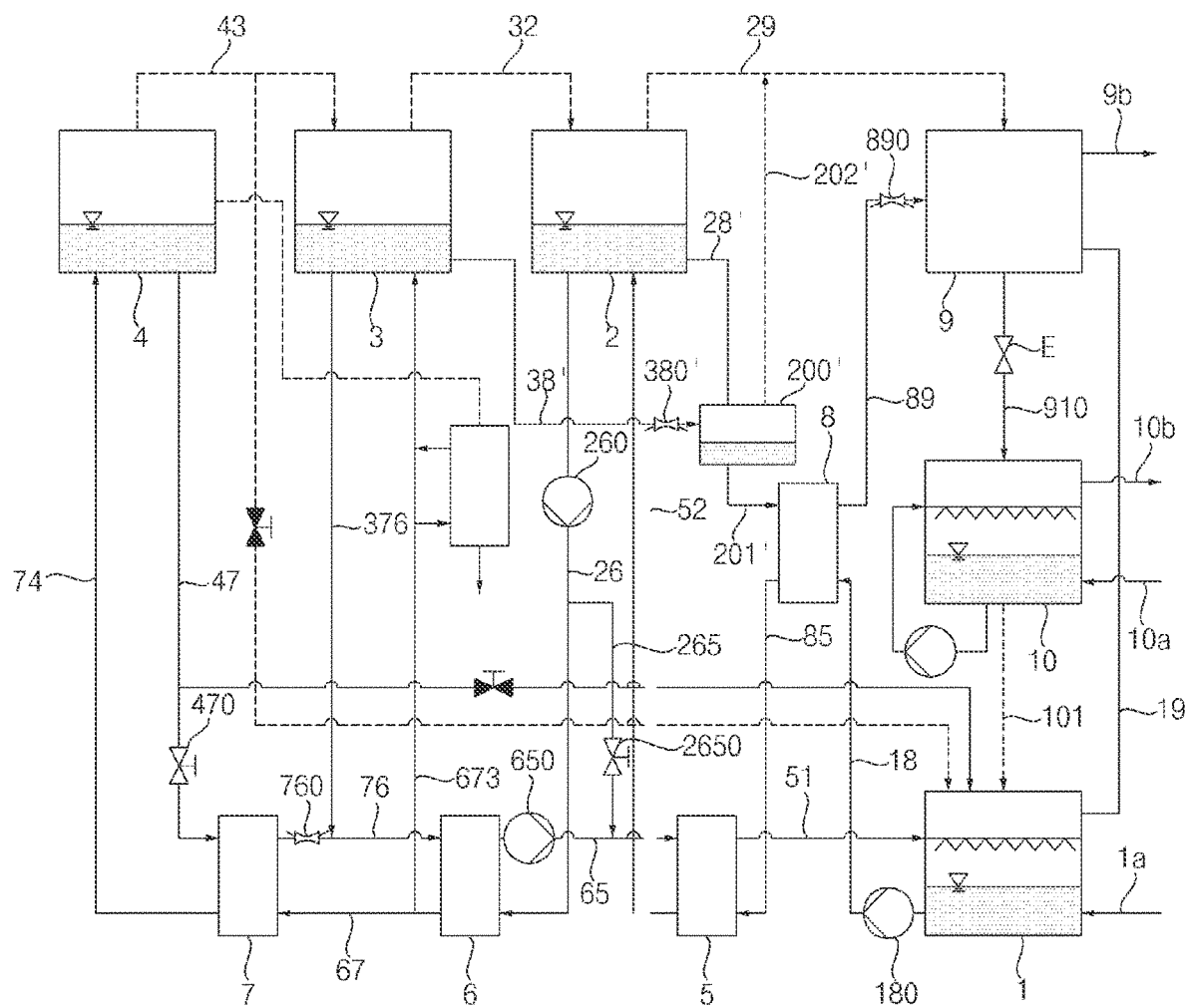
FIG. 3 is a schematic configuration diagram of a cooling machine according to another embodiment of the present disclosure.

Hereinafter, a cooling machine according to another embodiment of the present disclosure will be described with reference to FIG. 3.

The refrigerant separated from the medium temperature regenerator 3 and the low temperature regenerator 2 may be a gas state or a liquid state. As described above, the refrigerant of the gas state may flow into the condenser 9 through the second gas pipe 32 and the first gas pipe 29, and the refrigerant of the liquid state may be directly introduced into a gas-liquid separator 200' through a first drain pipe 28', and may be introduced directly into the gas-liquid separator 200' through a second drain pipe 38'. Accordingly, a confluence point 28P according to an embodiment of the present disclosure may not be formed.

A decompression device 380' for removing the differential pressure generated between the refrigerants discharged from the medium temperature regenerator 3 and the low temperature regenerator 2 inside the gas-liquid separator 200' may be connected to a second drain pipe 38'.

However, when the decompression device 380' does not function properly, even if the refrigerant introduced into the gas-liquid separator 200' through the second drain pipe 38' is in a state where the pressure is lowered by the decompression device 380', it may have a higher pressure than the refrigerant flowing into the gas-liquid separator 200' through the first drain pipe 28'.

In this case, due to the differential pressure between refrigerants in the gas-liquid separator 200', a flashing phenomenon in which some liquid state refrigerant in a saturated state vaporizes may occur, and there may be a problem that the refrigerant is not discharged smoothly to the condenser 9, and backflows to the low temperature regenerator 2 through the first drain pipe 28', as the specific volume of the refrigerant increases rapidly.

However, in the present embodiment, the refrigerant vaporized by the operation of the gas-liquid separator 200' is separated immediately, and discharged through a gas state discharge pipe 202', thereby suppressing a rapid increase in the specific volume of the refrigerant to solve the problem of flow-back of the refrigerant to the low temperature regenerator 2.

Since the configuration and operation principle of other cooling machine excluding the above are the same as in the embodiment of the present disclosure, the description is omitted.

Figure 5:
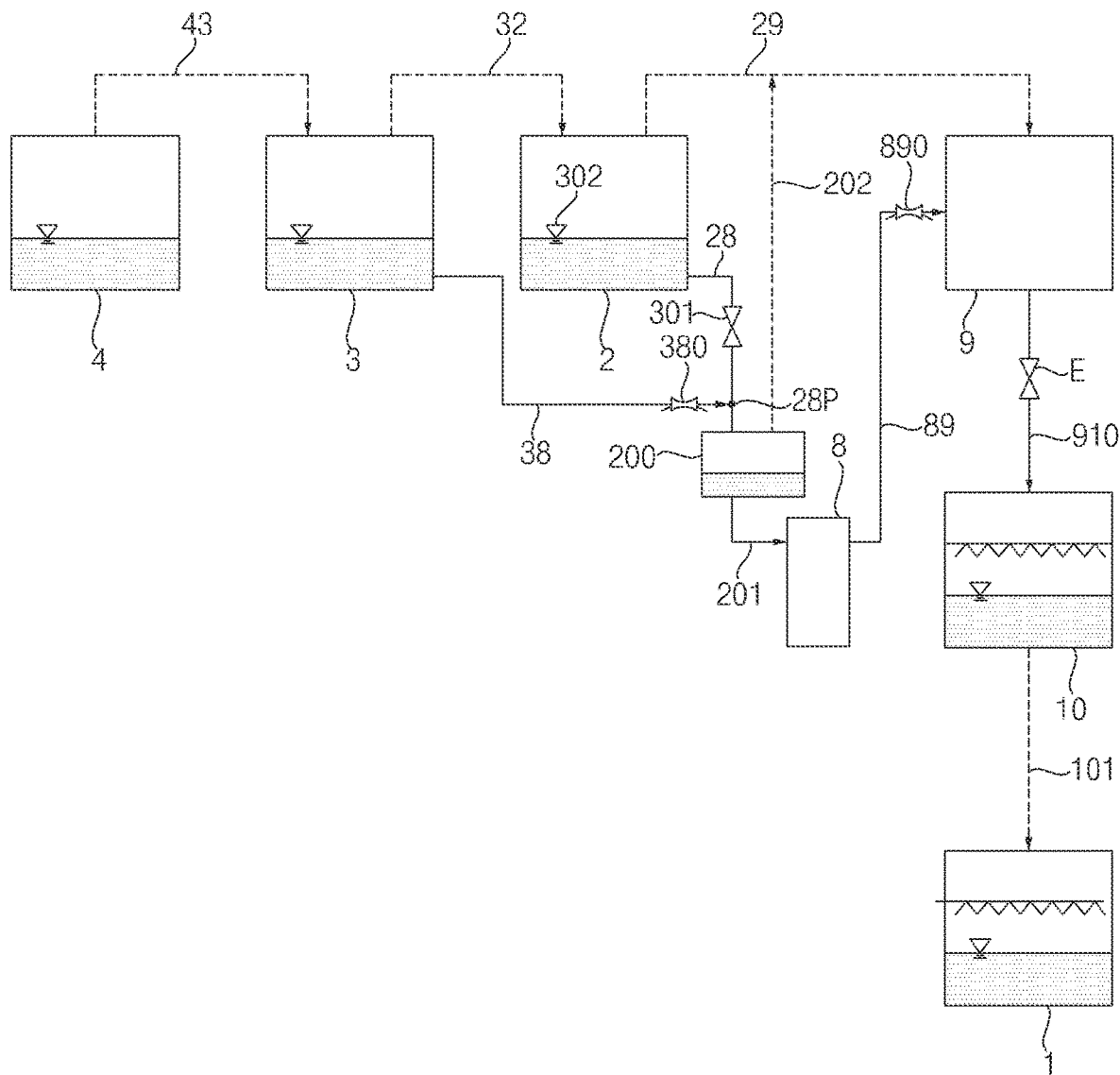
FIG. 5 is a schematic configuration diagram of a cooling machine to which a backflow prevention system is added according to an embodiment of the present disclosure.

Referring to FIG. 5, a backflow prevention device 300 that prevents refrigerant from flowing backward from the confluence point 28P to the low temperature regenerator 2 may be connected to the first drain pipe 28, and a water level sensor 302 for measuring the water level of the low temperature regenerator 2 may be disposed inside the low temperature regenerator 2.

At this time, the backflow prevention device 300 may include a backflow prevention valve 301 that varies the degree of opening according to the water level of the low temperature regenerator 2 measured by a water level sensor 302, and a user may tabulate the opening degree of the backflow prevention valve 301 corresponding to the water level value measured by the water level sensor 302, so that the opening degree of the backflow prevention valve 301 can be adjusted by the measured value of the water level sensor 302.

The user may set a threshold value of the water level of the low temperature regenerator 2 with respect to the water level sensor 302, and may set the backflow prevention valve 301 to be closed when the water level measured by the water level sensor 302 is higher than the threshold value.

The backflow prevention device 300 may be a comprehensive system for backflow prevention including the backflow prevention valve 301 and the water level sensor 302.

Figure 6:
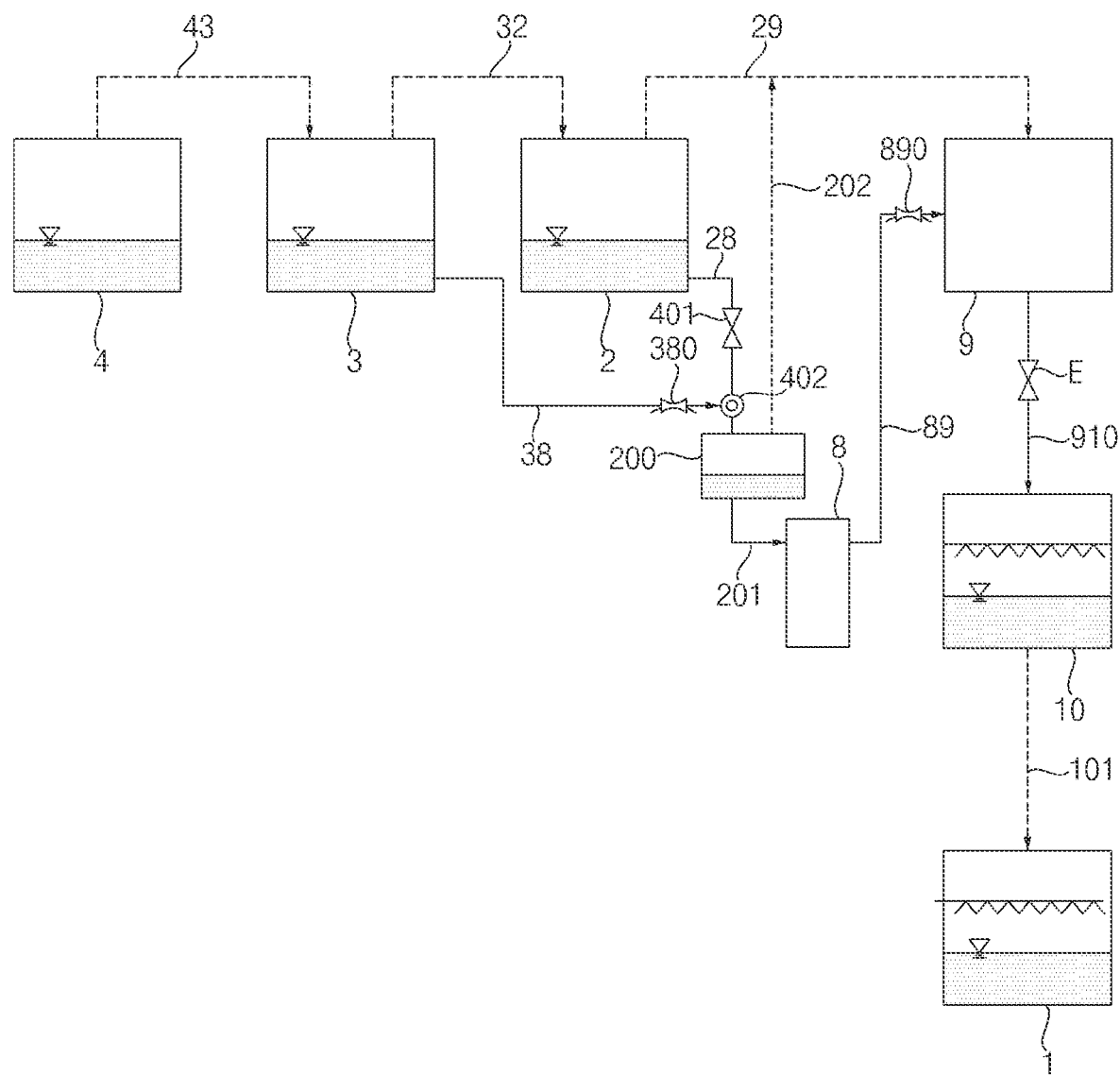
FIG. 6 is a schematic configuration diagram of a cooling machine to which another backflow prevention system is added according to an embodiment of the present disclosure.

Referring to FIG. 6, a backflow prevention device 400 that prevents refrigerant from flowing backward from the confluence point 28P to the low temperature regenerator 2 may be connected to the first drain pipe 28, and a dryness meter 402 for measuring the dryness of the refrigerant passing through the confluence point 28P may be mounted at the confluence point 28P.

At this time, the backflow prevention device 400 may include a backflow prevention valve 401 that varies the degree of opening according to the dryness value of the confluence point 28P measured by the dryness meter 402, and a user may tabulate the opening degree of the backflow prevention valve 401 corresponding to the dryness value measured by the dryness meter 402, so that the opening degree of the backflow prevention valve 401 can be adjusted by the measured value of the dryness meter 402.

The user can set the threshold value of the dryness at the confluence point 28P with respect to the dryness meter 402, and may set the backflow prevention valve 401 to be closed when the dryness value measured by the dryness meter 402 is higher than the threshold value.

The backflow prevention device 400 may be a comprehensive system for backflow prevention including the backflow prevention valve 401 and the dryness meter 402.

As described above, the cooling machine according to of the present disclosure has one or more of the following effects.

First, the refrigerant can be smoothly discharged to the condenser, and the refrigerant can be prevented from flowing back to the regenerator, by separating the refrigerant vaporized due to the flashing phenomenon caused by the pressure difference between the refrigerants flowing to the condenser.

Second, it is possible to increase the condensation efficiency in the condenser by dualizing the loop in which the gas state refrigerant and the liquid state refrigerant flow.

Third, it is possible to prevent failures or lifetime shortening due to defective operation beforehand, by establishing a system that immediately detects and responds to a defective operation state of the cooling machine.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooling machine comprising:
   an absorber to generate an absorption solution by mixing a refrigerant and an absorbent;
   a first regenerator to separate the absorption solution discharged from the absorber into the refrigerant and the absorbent;
   a second regenerator to separate the absorption solution discharged from the absorber into the refrigerant and the absorbent;
   a condenser to heat-exchange the refrigerant discharged from the first regenerator and the second regenerator;
   an expansion device to expand the refrigerant discharged from the condenser; an evaporator to heat-exchange the refrigerant discharged from the expansion device and to discharge the refrigerant to the absorber;
   a first drain pipe through which the refrigerant discharged from the first regenerator flows;
   a second drain pipe through which the refrigerant discharged from the second regenerator flows; and
   a gas-liquid separator to separate the refrigerant introduced through the first drain pipe and the second drain pipe into a gas state and a liquid state.

2. The cooling machine of claim 1, wherein a confluence point where the refrigerants flowing in the first drain pipe and the second drain pipe are converged is formed, and the refrigerant converged at the confluence point flows into the gas-liquid separator.

3. The cooling machine of claim 2, further comprising a decompression device for lowering a pressure of the refrigerant flowing in the second drain pipe,
   wherein the refrigerant whose pressure is lowered by the decompression device and the refrigerant flowing through the first drain pipe are converged at the confluence point, and the refrigerant passing through the confluence point flows into the gas-liquid separator while liquid state and gas state of the refrigerant are mixed.

4. The cooling machine of claim 1, further comprising a gas pipe connected to the condenser, wherein the refrigerant of gas state discharged from the first regenerator and the second regenerator flows through the gas pipe, and
wherein the refrigerant of gas state discharged from the gas-liquid separator is joined to the gas pipe.

5. The cooling machine of claim 4, wherein the gas pipe comprises:
a second gas pipe connecting the first regenerator and the second regenerator; and
a first gas pipe connecting the first regenerator and the condenser,
wherein the refrigerant of gas state discharged from the gas-liquid separator is joined to the first gas pipe.

6. The cooling machine of claim 1, further comprising a gas pipe connected to the condenser, wherein the refrigerant of gas state discharged from the first regenerator and the second regenerator flows through the gas pipe,
wherein the refrigerant of gas state discharged from the gas-liquid separator is joined to the gas pipe, and
wherein the refrigerant of liquid state discharged from the gas-liquid separator is introduced into the condenser.

7. The cooling machine of claim 6, wherein the refrigerant of gas state separated from the gas-liquid separator is discharged to an upper portion of the gas-liquid separator, and the refrigerant of liquid state is discharged to a lower portion of the gas-liquid separator.

8. The cooling machine of claim 6, wherein the refrigerant of gas state flows into an upper portion of the condenser through the gas pipe, and the refrigerant of liquid state discharged from the gas-liquid separator is introduced into a lower portion of the condenser.

9. The cooling machine of claim 1, wherein the refrigerant of liquid state discharged from the gas-liquid separator flows into the condenser while a pressure of the refrigerant is lowered by a liquid state decompression device that lowers the pressure of the refrigerant flowing into the condenser.

10. The cooling machine of claim 1, wherein the refrigerant flows into an upper portion of the gas-liquid separator, and
the refrigerant of gas state separated by an operation of the gas-liquid separator is discharged to the upper portion of the gas-liquid separator, and the refrigerant of liquid state is discharged to a lower portion of the gas-liquid separator.

11. The cooling machine of claim 1, further comprising a gas pipe connected to an upper portion of the condenser, wherein the refrigerant of gas state discharged from an upper portion of the first regenerator and an upper portion of the second regenerator flows through the gas pipe,
wherein the first drain pipe is connected to a lower portion of the first regenerator,
wherein the second drain pipe is connected to a lower portion of the second regenerator,
wherein the gas-liquid separator is disposed in a position lower than the first drain pipe and the second drain pipe, and
wherein the refrigerant of liquid state separated by the gas-liquid separator flows into a lower portion of the condenser.

12. The cooling machine of claim 1, further comprising a refrigerant condensation heat exchange unit to heat-exchange the refrigerant of liquid state separated by the gas-liquid separator.

13. The cooling machine of claim 12, wherein the refrigerant heat-exchanged by the refrigerant condensation heat exchange unit flows into the condenser.

14. The cooling machine of claim 12, wherein the refrigerant heat-exchanged by the refrigerant condensation heat exchange unit flows into the condenser, while a pressure of the refrigerant is lowered by a liquid state decompression device that lowers the pressure of the refrigerant heat-exchanged by the refrigerant condensation heat exchange unit.

15. The cooling machine of claim 1, wherein a backflow prevention device to prevent the refrigerant from flowing into the first regenerator is connected to the first drain pipe.

16. The cooling machine of claim 15, further comprising a water level sensor to measure a water level of the first regenerator,
wherein the backflow prevention device includes a valve device whose opening degree is adjusted according to a measured value of the water level sensor.

17. The cooling machine of claim 15, wherein a confluence point where the refrigerants flowing in the first drain pipe and the second drain pipe are converged is formed,
further comprising a dryness meter to measure a dryness of the refrigerant passing through the confluence point,
wherein the backflow prevention device includes a valve device whose opening degree is adjusted according to a measured value of the dryness meter.

18. The cooling machine of claim 1, further comprising a third regenerator to separate the absorption solution discharged from the absorber into the refrigerant and the absorbent,
wherein the third regenerator separates the refrigerant and the absorbent under a higher temperature and higher pressure than the first regenerator and the second regenerator.

* * * * *